US012741175B2

(12) United States Patent
Tuxen et al.

(10) Patent No.: US 12,741,175 B2
(45) Date of Patent: Sep. 22, 2026

(54) SYSTEM AND METHOD FOR DRIVING RANGE SHOT TRAVEL PATH CHARACTERISTICS

(71) Applicant: TRACKMAN A/S, Vedbaek (DK)

(72) Inventors: Fredrik Tuxen, Rungsted Kyst (DK); Cheng Chen, Herlev (DK); Mathias Strandgaard, Hvidovre (DK)

(73) Assignee: TRACKMAN A/S, Hørsholm (DK)

( * ) Notice: Subject to any disclaimer, the term of this patent is extended or adjusted under 35 U.S.C. 154(b) by 283 days.

(21) Appl. No.: 18/636,950

(22) Filed: Apr. 16, 2024

(65) Prior Publication Data

US 2024/0278071 A1 Aug. 22, 2024

Related U.S. Application Data

(63) Continuation of application No. 17/820,416, filed on Aug. 17, 2022, now Pat. No. 11,986,698, which is a
(Continued)

(51) Int. Cl.
*A63B 24/00* (2006.01)
*G01S 13/66* (2006.01)
(Continued)

(52) U.S. Cl.
CPC .......... *A63B 24/0021* (2013.01); *G01S 13/66* (2013.01); *G01S 13/88* (2013.01);
(Continued)

(58) Field of Classification Search
CPC ........ A63B 24/0021; A63B 2024/0031; A63B 2220/05; A63B 2220/30; A63B 2220/89;
(Continued)

(56) References Cited

U.S. PATENT DOCUMENTS 6,179,720 B1 * 1/2001 Rankin .............. A63B 69/3658 473/154
2018/0011183 A1 1/2018 Tuxen
(Continued)

FOREIGN PATENT DOCUMENTS

JP 62-076468 4/1987
JP 04-029064 1/1992
(Continued)

*Primary Examiner* — Jeffrey S Vanderveen

(74) *Attorney, Agent, or Firm* — Fay Kaplun & Marcin, LLP

(57) ABSTRACT

A method for determining golf shot characteristics includes detecting, in imaging data captured by an imager, a signature of a golf shot launched from a first launch area, a field of view of the imager including one of the first launch area and an area adjacent to the first launch area, and determining, from the imaging data, first golf shot characteristics, the first shot characteristics including a first launch location and a first launch time in combination with determining whether the first launch location and the first launch time correspond to a second launch location and a second launch time for second golf shot characteristics determined from sensor data captured by a further sensor arrangement and when no correspondence is found between the first and second launch locations and the first and second launch times, transmitting the first shot characteristics to a display at the first launch location.

19 Claims, 7 Drawing Sheets

Related U.S. Application Data continuation of application No. 16/795,075, filed on Feb. 19, 2020, now Pat. No. 11,452,911.

(60) Provisional application No. 62/809,083, filed on Feb. 22, 2019.

(51) Int. Cl.

*G01S 13/88* (2006.01)
*G06T 7/00* (2017.01)
*G06T 7/246* (2017.01)

(52) U.S. Cl.

CPC ............ *G06T 7/0002* (2013.01); *G06T 7/248* (2017.01); *A63B 2024/0031* (2013.01); *A63B 2220/05* (2013.01); *A63B 2220/30* (2013.01); *A63B 2220/89* (2013.01); *G06T 2207/30224* (2013.01)

(58) Field of Classification Search

CPC ......... A63B 69/36; G01S 13/66; G01S 13/88; G01S 13/581; G01S 13/72; G01S 13/867; G01S 13/89; G01S 17/42; G01S 17/66; G01S 17/88; G01S 17/89; G06T 7/0002; G06T 7/248; G06T 2207/30224; G06T 2207/10016; G06T 2207/30221; G06T 7/20

See application file for complete search history.

(56) References Cited

U.S. PATENT DOCUMENTS

| | | | |
|---|---|---|---|
| 2019/0391254 A1* | 12/2019 | Asghar .................. | H04N 23/60 |
| 2020/0269089 A1 | 8/2020 | Tuxen et al. | |

FOREIGN PATENT DOCUMENTS

| | | |
|---|---|---|
| JP | 2006293835 A | 10/2006 |
| JP | 2007101304 A | 4/2007 |
| JP | 2023-062022 | 5/2023 |
| WO | 2010/040219 | 4/2010 |

* cited by examiner 310
303

305
301
303
302

300
301
302

SYSTEM AND METHOD FOR DRIVING RANGE SHOT TRAVEL PATH CHARACTERISTICS

PRIORITY CLAIM

The present application is a Continuation of U.S. patent application Ser. No. 17/820,416 filed Aug. 17, 2022; which is a Continuation of U.S. patent application Ser. No. 16/795,075 filed Feb. 19, 2020, now U.S. Pat. No. 11,452,911; which claims priority to U.S. Provisional Patent Application Ser. No. 62/809,083 filed Feb. 22, 2019. The entire disclosure of these patent(s)/application(s) is expressly incorporated herewith by reference.

FIELD

The present disclosure relates to a system and a method for determining travel path characteristics for golf shots at a driving range.

BACKGROUND

Driving ranges may implement sensors (sometimes a relatively small number of sensors) to track a relatively large number of golf balls in simultaneous flight. For example, a system comprising three radars positioned around a range may be sufficient to track dozens or more concurrently flying golf balls originating from hundreds of hitting bays spread across multiple levels. Shot data may be captured by the radars, processed by a processing arrangement to determine a track of the shot and other characteristics, and provided to the hitting bay from which the shot originated so that each golfer may be provided with shot characteristics relating to his shots.

Depending on the sensors and their arrangement, such systems may be better able to track golf balls launched into the air at at least a minimum speed and height. For example, certain radar systems are not able to reliably detect balls travelling at less than 15 m/s or balls or which, even when travelling at 15 m/s or greater have short flight times, i.e. shots launched at low launch angles. These types of shots may be poorly struck or deliberate short shot such as chip shots or putts. In these cases, a computer receiving data from the sensors may be unable to discern the signature of such slow moving or low angle shots from the movement of other objects or from noise in the data.

SUMMARY

The present disclosure relates to a method for determining golf shot characteristics. The method includes detecting, in imaging data captured by an imager, a signature of a golf shot launched from a first launch area of a plurality of launch areas from which golf balls are to be launched, a field of view of the imager including one of the first launch area and an area adjacent to the first launch area; determining, from the imaging data, first shot characteristics for the golf shot, the first shot characteristics including a first launch location and a first launch time; determining whether the first launch location and the first launch time correspond to a second launch location and a second launch time for second shot characteristics determined from sensor data captured by a further sensor arrangement; and when no correspondence is found between the first and second launch locations and the first and second launch times, transmitting the first shot characteristics to a display at the first launch area.

In an embodiment, the method further includes when a correspondence is found between the first and second launch locations and the first and second launch times, transmitting the second shot characteristics to the display at the first launch area.

In an embodiment, the detecting the signature of the golf shot includes a blob detection identifying image features that correlate to a golf ball signature.

In an embodiment, the method further includes calculating a motion image from a plurality of adjacent image frames where a golf ball signature was detected, the motion image including a blur corresponding to the golf signature; and extracting features corresponding to the blur from the motion image.

In an embodiment, the extracted features include a length, width, blur factor, horizontal angle, and estimated launch position of the blur.

In an embodiment, the method further includes determining whether blobs detected in a plurality of images all correspond to a same golf shot based on a spatial and temporal check.

In an embodiment, the method further includes determining whether blobs detected in a plurality of images all correspond to a same golf shot based on an integer programming optimization.

In an embodiment, the method further includes calibrating the imager to the first launch area.

In an embodiment, the further sensor arrangement includes one of a radar array and an imaging system.

In an embodiment, the first shot characteristics include an initial velocity, an initial direction, and an estimated travel distance of the golf shot.

The present disclosure also relates to a system for determining golf shot characteristics. The system includes an imager capturing imaging data and having a field of view including a first launch area of a plurality of launch areas from which golf shots are to be launched and an area adjacent to the first launch area. In addition, the system includes a processing arrangement detecting, in the imaging data, a signature of a golf shot launched from the first launch area, the processing arrangement determining, from the imaging data, first shot characteristics for the golf shot, the first shot characteristics including a first launch location and a first launch time, the processing arrangement determining whether the first launch location and the first launch time correspond to a second launch location and a second launch time for second shot characteristics determined from sensor data captured by a further sensor arrangement, the processing arrangement, when no correspondence is found between the first and second launch locations and the first and second launch times, transmitting the first shot characteristics to a display at the first launch area.

In an embodiment, when a correspondence is found between the first and second launch locations and the first and second launch times, the processing arrangement transmits the second shot characteristics to the display at the first launch area.

In an embodiment, the processing arrangement detects the signature of the golf shot employs blob detection to identify image features that correlate to a golf ball signature.

In an embodiment, the processing arrangement calculates a motion image from a plurality of adjacent image frames in which a golf ball signature was detected, the motion image including a blur corresponding to the golf signature and extracts features corresponding to the blur from the motion image.

In an embodiment, the extracted features include a length, width, blur factor, horizontal angle, and estimated launch position of the blur.

In an embodiment, the processing arrangement determines whether blobs detected in a plurality of images correspond to a same golf shot based on a spatial and temporal check.

In an embodiment, the processing arrangement determines whether blobs detected in a plurality of images correspond to a same golf shot based on an integer programming optimization.

In an embodiment, the imager is calibrated to the first launch area.

In an embodiment, the further sensor arrangement includes one of a radar array and an imaging system.

In an embodiment, the first shot characteristics include an initial velocity, an initial direction, and an estimated travel distance of the golf shot.

In addition, the present disclosure relates to a system for supplying golf shot characteristics to a plurality of hitting bays in a driving range. The system includes a primary sensing arrangement detecting data corresponding to shot characteristics of each of a plurality of golf shots launched from the hitting bays of the driving range; an imager capturing imaging data and having a field of view including one of a first one of the hitting bays and an area adjacent to the first hitting bay; and a processing arrangement. The processing arrangement is detecting, in the imaging data, a signature of the golf shot launched from the first hitting bay, the processing arrangement determining, from the imaging data, first shot characteristics for the golf shot, the first shot characteristics including a first launch location and a first launch time, the processing arrangement determining whether the first launch location and the first launch time correspond to a second launch location and a second launch time for second shot characteristics determined from sensor data captured by the primary sensing arrangement wherein, when no correspondence is found between the first and second launch locations and the first and second launch times, the processor transmits the first shot characteristics to a display at the first hitting bay.

In an embodiment, the primary sensing arrangement includes a radar device unable to reliably track golf shots having one of a speed below a first threshold level and a flight time below a second threshold level, the processing arrangement supplying to the first hitting bay data based on the imaging data for shots launched from the first hitting bay having one of a speed below the first threshold level and a flight time below the second threshold level.

BRIEF DESCRIPTION

Figure 2:
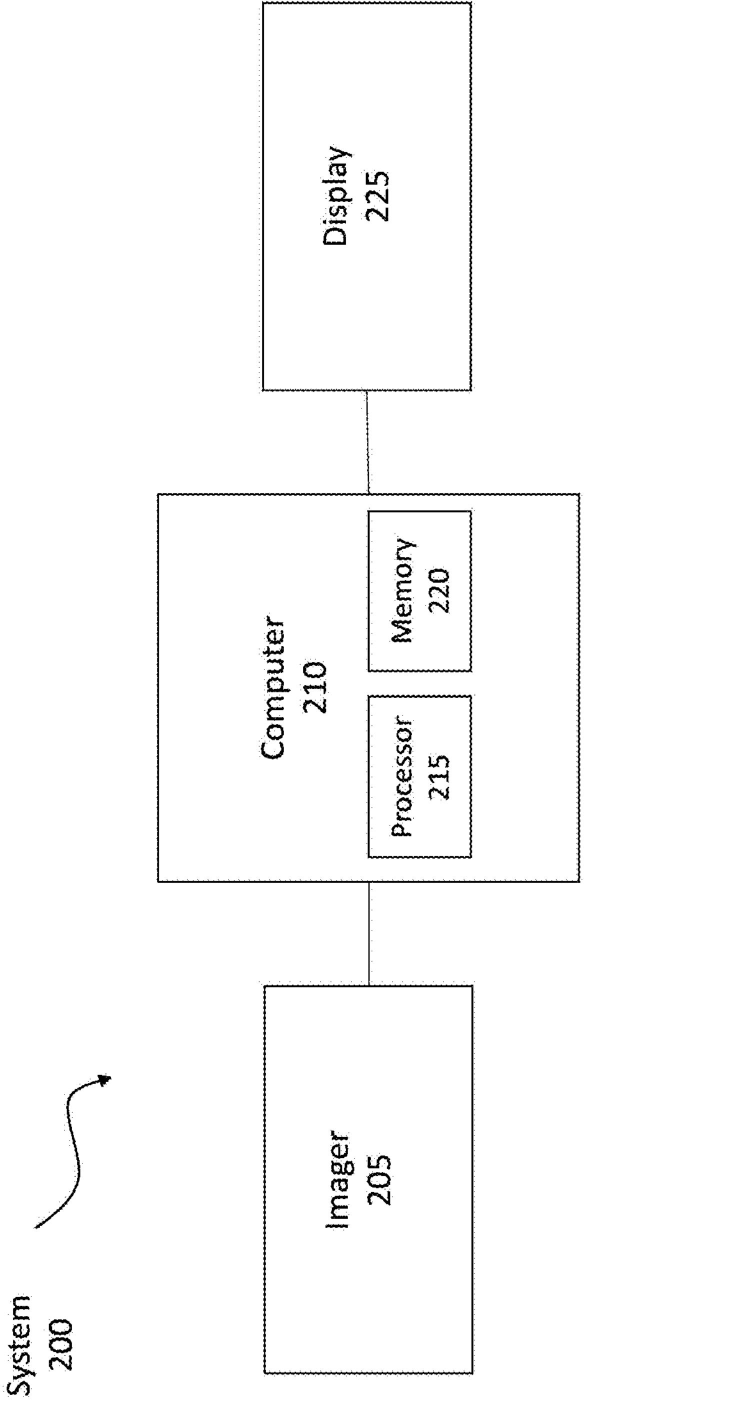
FIG. 2 shows a system for determining shot characteristics according to a first exemplary embodiment.
Figures 3A, 3B, 3C:
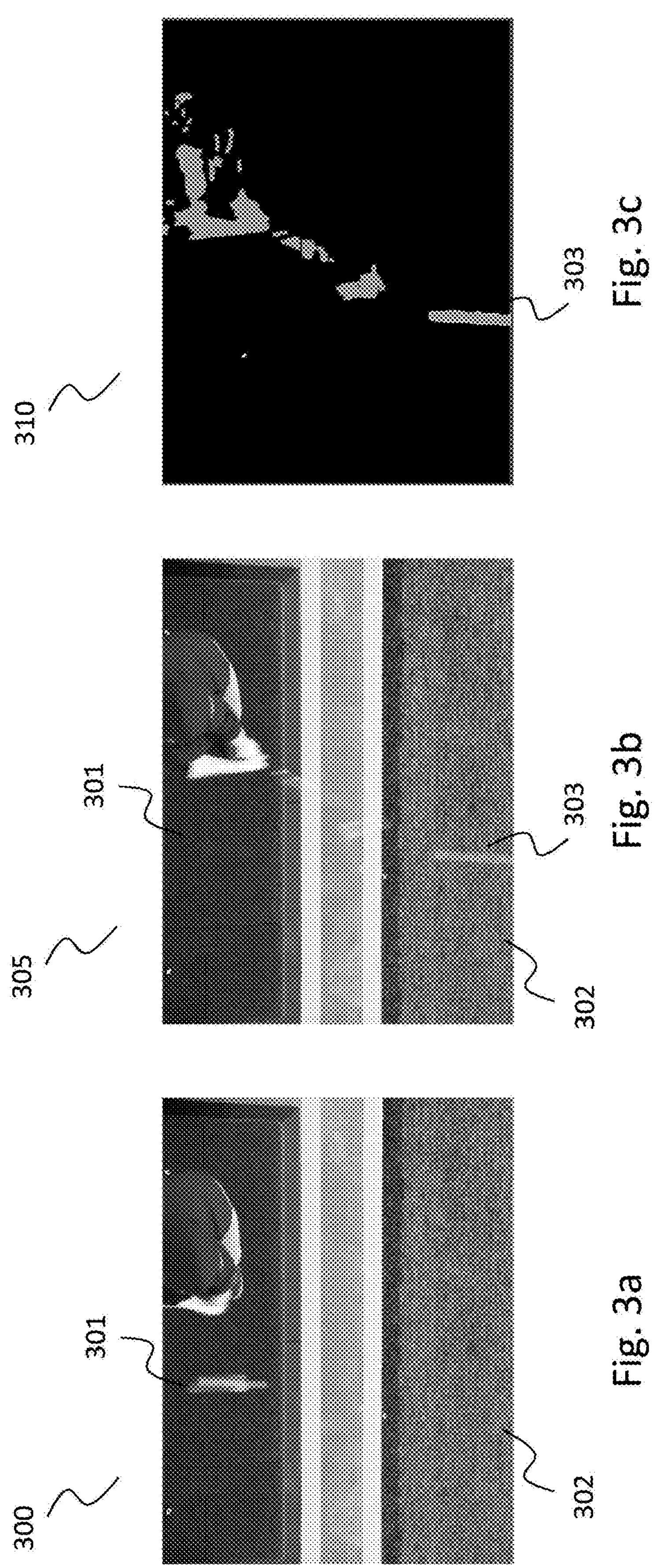

FIG. 3*a* shows an exemplary frame provided by the imager of FIG. 2 including a launch region within a hitting bay and an area of the target area adjacent to the hitting bay.

FIG. 3*b* shows an exemplary frame where a blob corresponding to a ball signature has been captured and detected.

FIG. 3*c* shows the image of FIG. 3*b* after thresholding and contour extraction.

Figure 3E:
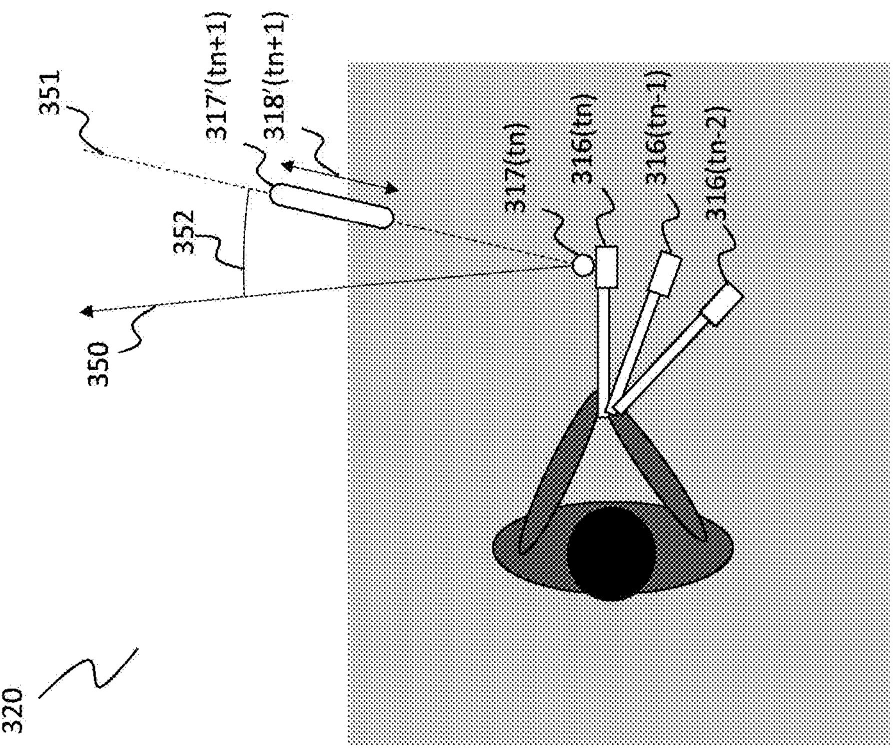
Figure 3D:
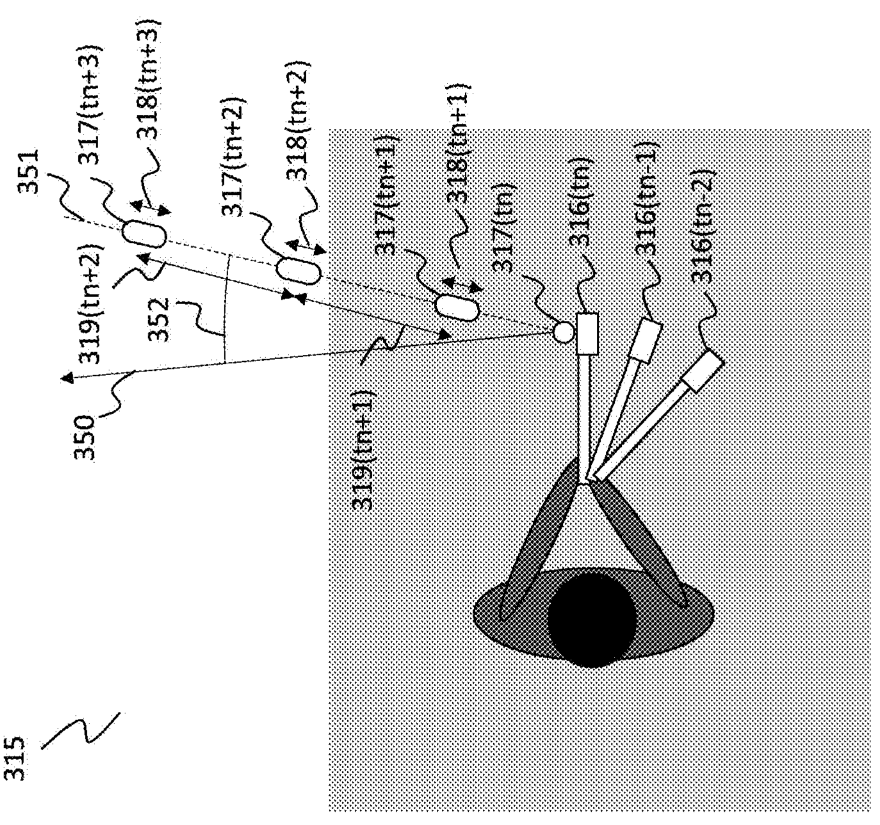

FIG. 3*d* shows an exemplary diagram illustrating a progression of frames captured with a shorter exposure time.

FIG. 3*e* shows an exemplary diagram illustrating a progression of frames captured with a longer exposure time.

Figure 1:
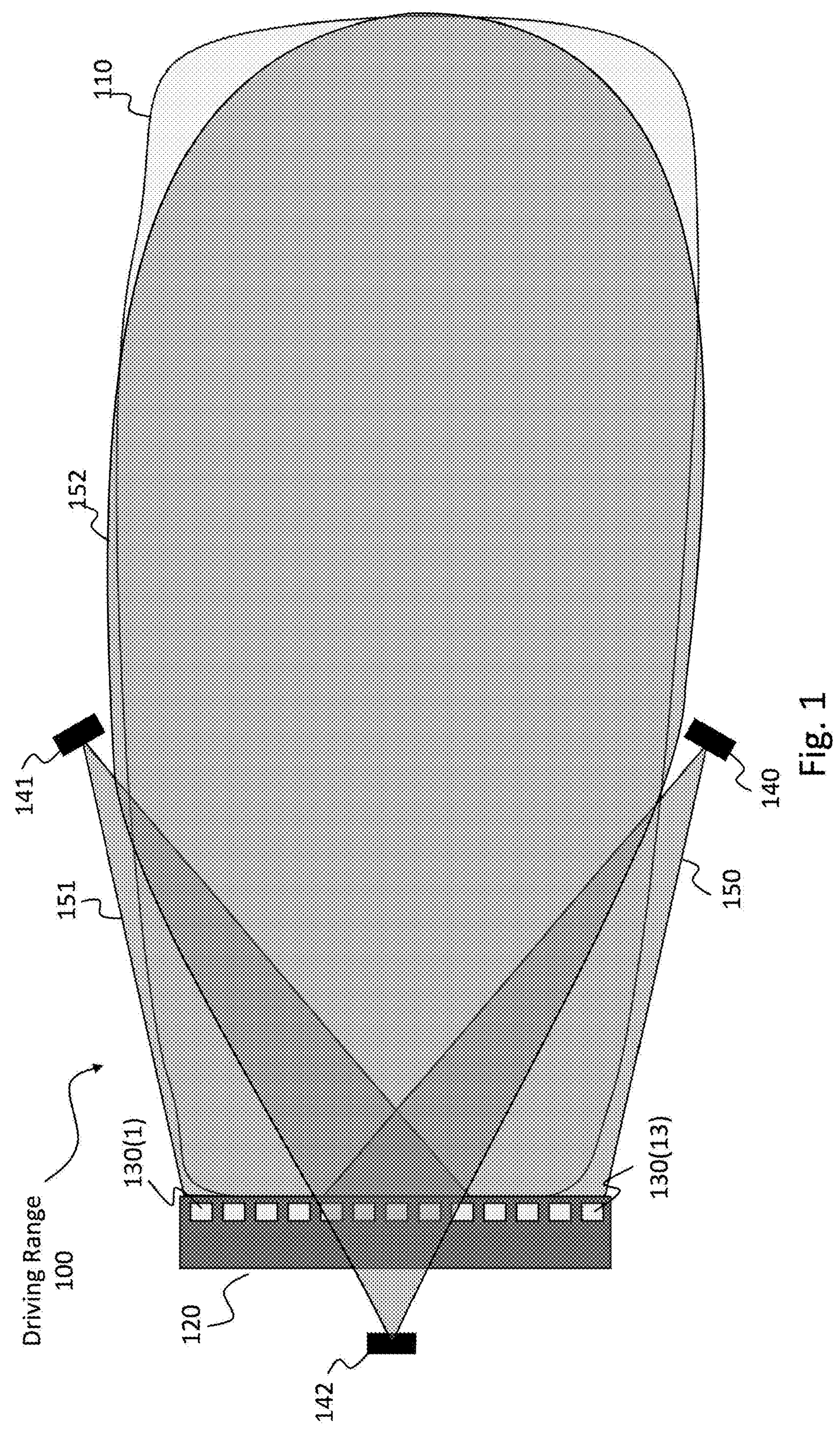
FIG. 1 shows a driving range including a plurality of sensors for capturing shot data.
Figure 4:
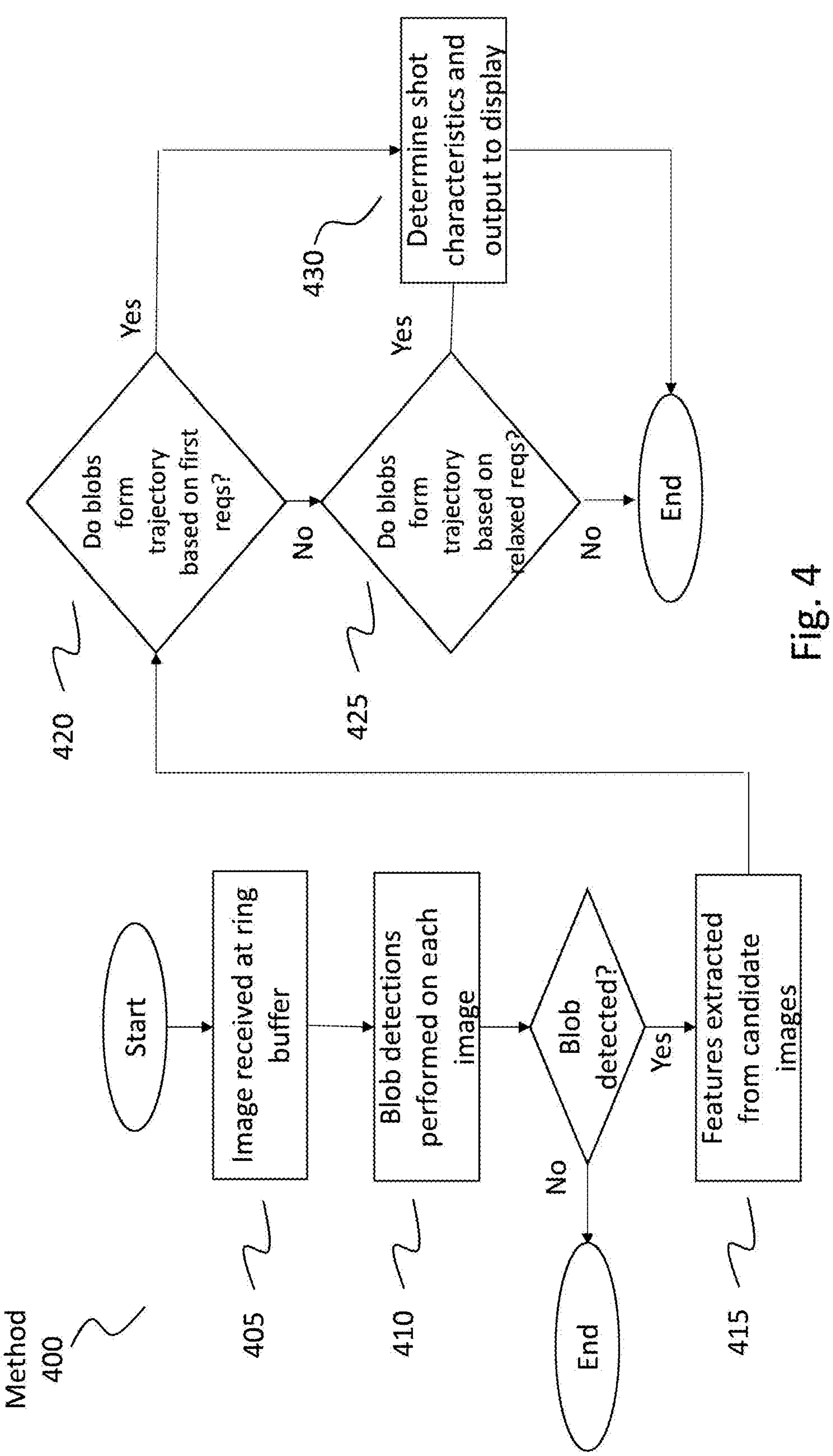
Figure 5:
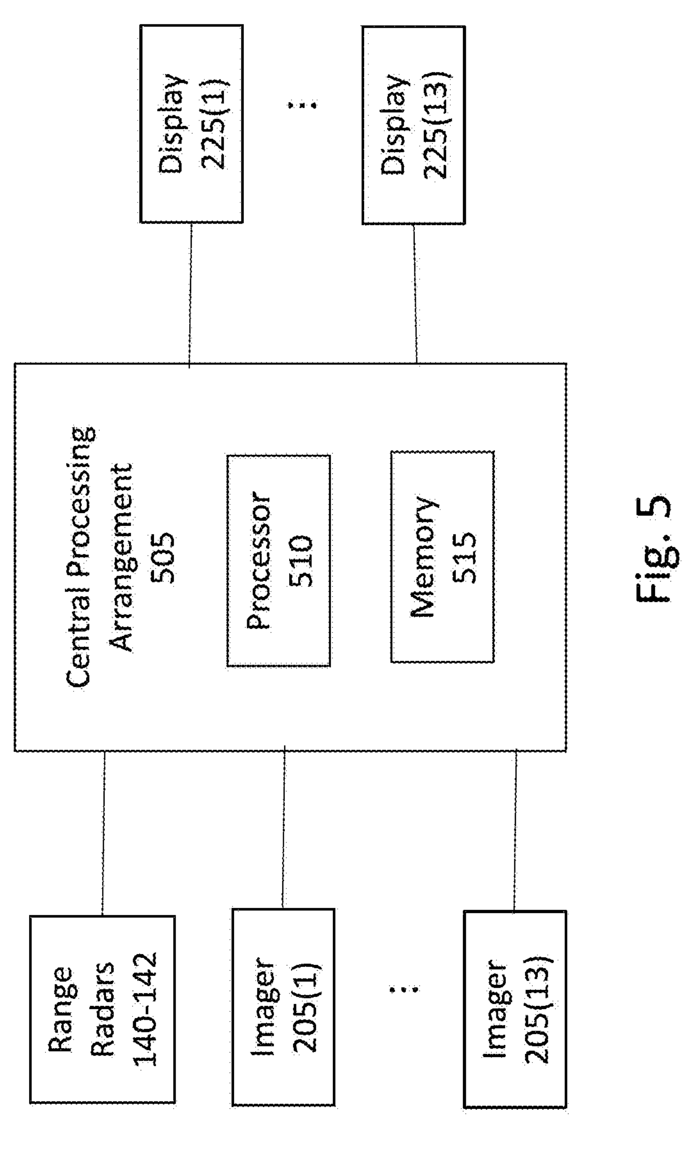

FIG. 4 shows a method implemented at the system of FIG. 2 for detecting and extracting information from the signature of a moving ball in the image data FIG. 5 shows a system implemented at the driving range of FIG. 1 for providing shot feedback when a ball is unable to be tracked by other range sensors.

Figure 6:
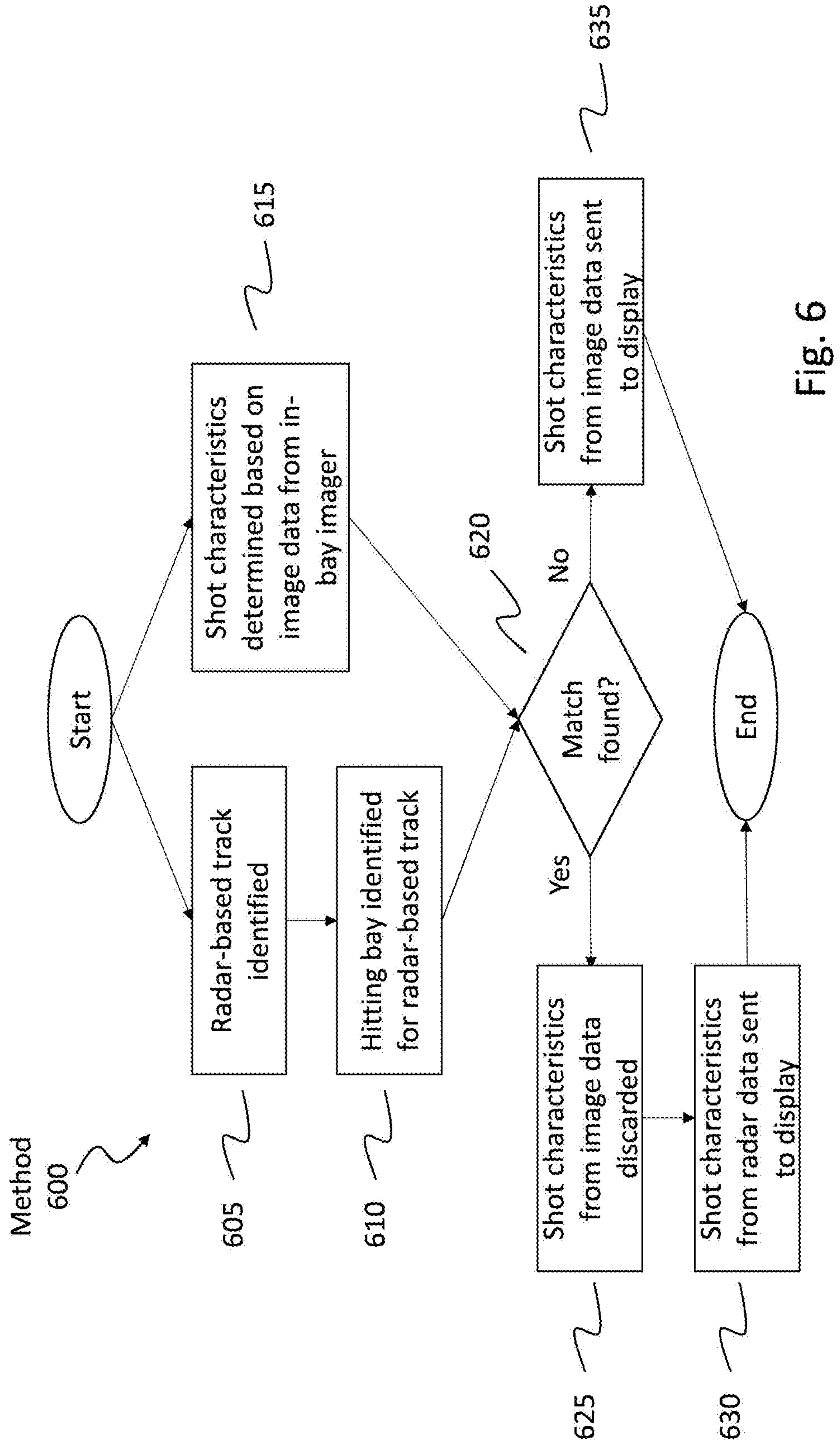

FIG. 6 shows a method for harmonizing shot data captured by multiple sensors of the system of FIG. 5.

DETAILED DESCRIPTION

The exemplary embodiments describe a system and method for providing travel path characteristics for golf shots. More particularly, the system is implemented at a driving range for determining characteristics of golf shots which may be otherwise difficult to or impossible to track accurately using current systems. The present embodiments enable accurate tracking of such low speed and/or low launch angle shots by providing alternate arrangements for capturing and processing shot data. Although the exemplary embodiments will be described relative to a driving range having multiple hitting bays, the data capture and processing techniques described herein may be applied at a range with only a single hitting bay, at a range with an open launch area (e.g., without a structure defining individual hitting bays), at an indoor setting where shots are launched into a screen, or in any other situation in which it is desired to track projectiles.

According to one embodiment, an imager is positioned in or adjacent to each hitting bay in a driving range to capture images of golf shots originating from that hitting bay. Shot characteristics are determined for each shot based on the imager data and matched to shots tracked by the other range sensors, to yield a comprehensive track of the shot over the course of its travel. If no match is found, shot characteristics determined based solely on data from the images from the in-bay imager are used to provide feedback to the golfer, e.g. by displaying shot aspects such as a launch speed, launch angle, estimated distance traveled, etc. If a match is found, the shot characteristics determined based on the images from the in-bay imager may be discarded, while the shot characteristics determined from data captured by the other range sensors may be used.

FIG. 1 shows a driving range 100 including a plurality of sensors for capturing shot data. The range 100 includes a launch area 120 from which a user may strike golf balls into a target area 110. The launch area 120 has a plurality of hitting bays 130 that may be disposed across multiple levels. In the present embodiment, the launch area 120 is shown as having only a single level having thirteen hitting bays 130(1)-130(13), however, the launch area may be any size and have any number of hitting bays 130. For example, the launch area 120 may have hundreds of hitting bays 130. Alternately, the launch area 120 may be relatively open, without structural limitations defining hitting bays. The launch area 120 may be straight, so that the optimal launch direction from each hitting bay 130 is the same direction, or it may have a minor curvature.

In the present embodiment the driving range 100 has three range radars, i.e. a first radar 140 having a first field of view (FOV) 150 and second radar 141 having a second FOV 151 positioned on the sides of the target area 110 and a third radar 142 having a third FOV 152 positioned above the launch area 120. However, those skilled in the art that a system using any number of sensors (radar, imagers, etc.) may be operated using the same principles described herein. The first and second radars 140, 141 may be directed toward the launch area 120, while the third radar 142 is directed from above the launch area 120 out toward the rear of the target area 110.

With this arrangement, the third radar 142 covers most of the target area 110 within its FOV 152, particularly the deeper portions of the target area 110 further away from the launch area 120, and the first and second radars 140, 141 together cover the portion of the target area 110 adjacent to the launch area 120 within their fields of view 150, 151. These three radars 140-142 may track a relatively large number of golf balls, e.g. dozens or more, in simultaneous flight. Raw data from this exemplary radar system is provided to one or more computers, e.g., the central processing arrangement 505 described further below, that determines which of the hitting bays 130 a launched ball originated from and provides flight details of the launched ball to a display in the proper hitting bay.

Some shots may be detected by only one of the three radars, while others may be detected by two or all three of the radars at various independent and/or overlapping moments in time, with the respective tracks stitched together, averaged, or otherwise combined to determine a full track and other characteristics of the flight of the ball. Driving range ball tracking using a multi-radar array has been previously described in, for example, U.S. Publ. Appln. No. 2018/0011183, which is hereby incorporated by reference in its entirety. The radar array discussed above is described for exemplary purposes only. Other sensors such as imagers, LIDAR, etc. may be used to track a majority of the shots launched from the launch area 120.

For example, the range sensor system may be camera-based. A plurality of cameras may be deployed above the launch area 120 and directed out to the target area 110. The cameras may be spaced from one another by a predetermined distance, e.g., 10-20 meters, and stereo vision techniques or similar techniques may be implemented to determine characteristics of shots launched from the launch area 120 (e.g., three-dimensional trajectory data). However, such a system may also have difficulty detecting some shots, e.g. shots having flight trajectories shorter than 20-25 meters (i.e., distance from launch location to first impact with the ground of 20-25 meters). The systems described below are provided as a means to supplement the data provided by the other range sensors.

FIG. 2 shows a system 200 for determining shot characteristics according to a first exemplary embodiment. The system 200 may be implemented independently from a driving range. However, a principal purpose for the system 200 is to provide an alternate tracking system for supplementing a primary tracking system, such as the three-radar system described above, that has difficulties tracking low or softly hit balls. Thus, in the present embodiment, the system 200 may be implemented at a hitting bay 130 of the driving range 100 and is described relative thereto. An instance of the system 200 may be provided individually at each of the hitting bays 130(1)-130(13), at each of a subset of the hitting bays 130, or at a single hitting bay 130.

The system 200 includes an imager 205 configured to capture image data (i.e. frames of a scene including a launch location for a golf ball and the area immediately in front of the launch location) or an area adjacent to the launch location in the intended direction of launch. The imager 205 in this embodiment is positioned above the hitting bay 130, mounted, for example, to a structure within the hitting bay 130. The imager 205 may be mounted at varying heights, e.g. 3-5 meters, and directed straight downward, or at an angle, so long as the field of view of the imager 205 encompasses the above described areas. FIG. 3*a* shows an exemplary frame 300 provided by the imager 205 including a launch region 301 (i.e., an area from which it is expected balls will be launched, e.g. a hitting mat) within a hitting bay 130 and an area 302 of the target area 110 adjacent to the hitting bay 130 in the direction of expected travel of balls hit from the hitting bay 130.

The imager 205 is calibrated to determine the position and orientation of the camera relative to the launch region 301. This may be done in a number of ways. In a first example, a calibration may be performed as would be understood by those skilled in the art by placing a checkerboard of known dimensions at the hitting area to correlate the known dimensions and location of the checkerboard to pixel locations in images from the imager. In a second example, a predetermined dimension of the hitting mat may be correlated with a pixel location. In a third example, a known FOV of the imager 205 is associated with a predetermined distance from the imager 205 to the hitting mat.

In a fourth example, the calibration may entail tracking shots from the launch region 301 with both the imager 205 and other range sensors and adjusting parameters of the imager 205 so that both systems deliver identical data. Combinations or alterations of the above-described calibrations may be used, depending on various factors including e.g. the nature of the launch region 301. For example, as discussed above, the launch area 120 may be an open area without predefined hitting bays. In such a scenario, the imager 205 may be calibrated to an undefined launch region using e.g. the fourth example provided above.

As would be understood by those skilled in the art, the imager 205 is selected to have a frame rate sufficiently high to capture multiple images of a ball in flight as the ball traverses the field of view of the imager 205. For example, the frame rate for the imager 205 may be between 60 and 120 fps. A higher frame rate, e.g. 120 fps, may be used in day time and a lower frame rate, e.g. 60/90 fps may be used at night to gain a better signal quality on the ball. The imager 205 may have a rolling shutter, i.e. capturing image data one line (of pixels) at a time in a pattern that moves sequentially across an imager (e.g., light sensitive chip) of the imager 205. In such a case, the imager 205 is preferably oriented so that a direction across the imager in which the pixels are exposed through the rolling shutter (i.e. a direction from a first line of pixels to be exposed to the next line of pixels to be exposed, etc.) is the same as an expected direction of movement of the ball across the field of view of the imager 205.

In other words, regarding the frame 300 shown in FIG. 3*a*, the imager 205 is oriented so that image data is captured beginning at the top of the FOV (including the launch region 301) and progress down to the bottom of the FOV (including the area 302) to maximize in each frame the length of the path of travel of the ball imaged across the frame. In other embodiments, the imager 205 may have a wide-angle lens to extend a field of view of the imager 205 and, consequently, to extend a length of the path of travel of the ball through that field of view. As would be understood by those skilled in the art, the lighting of the field of view of the imager 205 may be enhanced as necessary to achieve the desired sharpness/clarity of images by, for example, one or more light sources and this may be especially true for indoor or night-time conditions. The imager 205 may be configured to operate at various wavelengths. For example, the camera may operate in the visual spectrum or in the infrared (or near-infrared) spectrum.

The imager 205 may implement an exposure control for adjusting the exposure and gain so that the pixel intensity histogram for the image reflects optimal exposure conditions. For the present embodiments, an image that is "exposed to the right," i.e. captured using an increased exposure time to collect as much light as possible while avoiding overexposing the image, is preferred relative to an ideal exposure for a typical image intended for human viewing. One procedure for controlling the exposure of the imager 205 is described below, however, other exposure control techniques known in the art may be used. For example, auto-exposure techniques have been previously described in U.S. Publ. Appln. No. 2011/0293259 and U.S. U.S. Pat. No. 9,871,972 the entire disclosure of which is hereby incorporated by reference. The general principle for auto-exposure is to attain a maximum brightness in the image while minimizing saturation.

An additional exposure problem may be caused by reflections of the scene or a similar situation caused by various difficult lighting conditions. These issues may be obviated by using a polarization filter in front of the camera lens so that reflections are prevented from being captured and to reduce the light intensity to allow a longer exposure time.

Fast-moving objects, e.g. launched golf balls, may be captured by the imager 205 as a linear blur, particularly if the imager 205 has a long exposure time—i.e., an exposure time resulting in the traversal of a significant portion of the field of view by the ball during the exposure of a single frame. The exposure time may range from approximately 34 us to 15 ms, depending on the lighting conditions. A short exposure time with a high light intensity may provide sharper pictures showing a substantially round image of the ball, whereas in long-exposure frames the ball will appear as a linear blur with rounded ends. In this embodiment, the camera may determine velocity by measuring a length of the blur representing the distance traversed by the ball and comparing this to the exposure time. The horizontal direction of the ball is also clearly derivable from the direction of the blur, while the horizontal velocity of the ball is determined based on the length of the blur and dividing this length by the known exposure time. Although a longer exposure time is preferred to minimize background noise, as described above, the detection algorithm described below is sufficiently robust to function well in short exposure scenarios.

FIG. 3*d* shows an exemplary diagram 315 illustrating a progression of frames captured with a shorter exposure time, while FIG. 3*e* shows an exemplary diagram 320 illustrating a progression of frames captured with a longer exposure time. A golf club 316 is shown at three points in time, tn−2, tn−1 and tn, where tn represents the moment at which a golf ball 317 is struck. In FIG. 3*d*, the frame rate is higher and the exposure is shorter, resulting in three images of the golf ball 317 in motion being captured at times tn+1, tn+2, tn+3 before the ball 317 leaves the FOV of the imager 205. The ball 317 travels along a path 351 at an angle 352 relative to a target line 350. The short exposure time provides a sharper picture showing a substantially round image of the ball 317 that may have a slight elongation 318. In the exemplary diagram 315, the horizontal motion of the ball may be determined by calculating the change in position of the ball 317 between frames (shown as reference numeral 319) and calculating a velocity based on a known camera frame rate. The angle 352 may also be determined by projecting the path 351 back to a launch position and comparing the direction of the path 351 to the target line 350. In FIG. 3*c*, however, the frame rate is lower and the exposure is longer, resulting in a single image of the golf ball 317 in motion being captured at time tn+1, before the ball 317 leaves the FOV of the imager 205. The length of the linear blur 317' representing the ball 317 may be measured and the horizontal velocity of the ball determined therefrom, as well as the horizontal angle 352, as discussed above.

The system 200 further includes a computer 210 configured to receive and process the images captured by the imager 205. The computer 210 comprises a processor 215 and memory 220 storing e.g. images and algorithmic instructions for execution by the processor 215. The computer 210 may be provided independently, i.e. as a separate computer 210 for processing shots from a single hitting bay 310, or it may be part of a broader processing arrangement for the entire driving range 100. For example, as will be described in further detail below, the shot characteristics determined from the image data captured by the imager 205 may be compared to the shot characteristics determined from the radar data captured by the radars 140-142 and, when a shot trajectory is detected by the radars and a track determined therefrom, the shot characteristics determined from the image data may be discarded or otherwise not provided to the golfer.

From the images, the computer 210 may determine shot characteristics including, for example, an initial velocity and a direction of the launched ball. Further characteristics, including e.g. a time at which the ball was struck, may also be determined so that the ball detection of the imager 205 may be matched in time and compared to a ball detection from one or more of the range radars. These determinations will be described in further detail below. Once the shot characteristics have been determined, feedback based on the shot characteristics may be provided to a display 225 positioned in the hitting bay 130 from which the shot originated. The display 225 may show the determined shot characteristics and may also show projected flight path details, such as an estimated distance that the ball would travel given the initial velocity and an ultimate rest position relative to the hitting bay based on the initial velocity and the direction.

FIG. 4 shows a method 400 implemented at the system 200 for detecting and extracting information from the signature of a moving ball in the image data. In 405, images captured by the imager 205 are sent to a ring buffer. The ring buffer is a portion of the memory 225 for storing images where older images are continuously overwritten after the ring buffer is at its capacity. For example, if the ring buffer stores 1000 images at any one time, the $1001^{st}$ image captured will replace the first image captured, the $1002^{nd}$ image captured will replace the second image captured, etc. If the frame rate of the imager 205 is 90 fps, each image in a 1000 image ring buffer will be overwritten in approximately 11 seconds. The size of the ring buffer may vary depending on the image resolution and the time needed to move the image data from the camera to the CPU memory. The image resolution is determined based on a minimum number of pixels corresponding to the ball and a minimum FOV. However, the resolution should not be so high as to require so many resources from the CPU that frames are dropped.

In 410, a blob detection is performed on each of the images to detect candidate image features that may correlate to a ball. The detection step may, for example, be performed on only the portion of the image comprising the area 302, i.e. the portion of the target area adjacent to the hitting bay 130, which may be considered a trigger area for detecting a ball at launch. Alternately, if the computer used is sufficiently fast, the whole image may be used. Given a known size and shape of a golf ball, and an approximate distance between the imager 205 and the ball, the computer 210 identifies candidates that correspond to the signature of a ball traveling through the trigger area. If no blob meeting the threshold requirements is detected in the image, the method ends. It is likely that no blob will be detected in the vast majority of the images captured by the imager 205, considering the frequency with which a golfer typically takes shots and the short amount of time that a struck ball will typically take to move through the area 302.

The signatures of various other objects, e.g. a club or a body part from the hitting bay in which the camera is mounted, balls launched from other hitting bays, birds, etc., may be detected as possible candidates as well, however, these will be discarded at later stages of analysis. The blob detection functions as a coarse filter for images of interest that ensures that a ball that is, e.g., partially obscured by a club or otherwise difficult to identify is less likely to be missed. The blob detection is performed on a continuous basis as images are captured by the imager 205. FIG. 3*b* shows a frame 305 where a blob 303 corresponding to a ball signature has been captured and detected.

In 415, candidate frames, i.e. frames in which a blob has been detected that correlates to a ball shape/size, are further analyzed to extract features thereof. The feature extraction analysis comprises multiple substeps. First, the image is projected to another color space in which the most information lies so that random lighting conditions may be adapted to. A projection matrix is calculated by performing a principal component analysis (PCA) on the original color space (e.g. RGB), namely the spaced defined by the principle components. Thus, the original RGB image is transformed into a different space where the largest variance of the original information is kept in the space corresponding to the largest principle component, which represents the most information preserved in a single channel image. The finest single channel image may be calculated via the composition of the different image channels after color space transformation, depending on CPU capacity. The single channel image is extracted from all adjacent frames to calculate motion images.

Next, the motion image is smoothed, thresholded and filtered. The resulting image after thresholding is a binary image, for example, the frame 310 shown in FIG. 3*c*. Blob contours in the binary image are extracted so that a contour analysis-based blob filtering may be performed. Finally, the features of the surviving blobs are extracted from the edge contour. Specifically, a length, width, blur factor (length/width), shooting angle (horizontal), and estimated launch position, e.g. tee location, are determined from the edge contour. The stronger axis of the blob will correlate to the travel direction of the ball, and the weaker axis of the blob will correlate to the ball width. Based on the direction of the ball, an axis may be projected back to the launch region 301 and the estimated launch position is determined.

The PCA may be used in 415 to find an optimal color space. The spectrum of light in the FOV may vary during day and night as the imager 205 is sensing different signal frequencies. Thus, different color spaces may be looked at during different times. For example, red and green may be skipped during day time, but may be used during the night since the local lighting may correspond more to these bands. To overcome this, a PCA may be run on the color space from image data and the corresponding strongest principle vector will project RGB to a single color space where most of the information is kept. A higher signal to noise ratio may be seen after this projection.

In 420, it is determined whether the blobs from multiple images form a ball trajectory, i.e., correspond to a ball travelling through the field of view. First, the blob contours are clustered using unsupervised machine learning methods, e.g. hierarchical clustering to perform clustering of blobs based on their feature space description. Next, a spatial and temporal check is performed to determine whether the feature vectors correlate to one another. The spatial check uses a line model to match all the detected ball centroids with very small deviation, while the temporal check ensures that the detected ball is continuously moving in a given direction in temporal increments. Specifically, each of the feature vectors extracted in 415 for a first blob of a cluster are compared to the corresponding feature vectors of another blob from the cluster. If the features substantially match, it is determined that the blobs correspond to the same ball trajectory. If no cluster representing a ball trajectory is found, based on either not enough members in the cluster or failing the spatial and temporal check, the method proceeds to 425.

In 425, a second matching is performed based on relaxed matching requirements. Specifically, another unsupervised clustering is performed on a reduced feature space and with increased clustering requirements. For example, a ball that was moving particularly fast may not appear in enough images, e.g. three, to form a substantial enough cluster to satisfy 420. With a reduced feature space but increased clustering requirement (smaller within class variance), candidate blobs may satisfy the remaining feature matching requirements to a substantial enough degree to determine that the blobs correspond to the same ball trajectory.

In 430, when it is determined, in either 420 or 425, that a ball trajectory has been identified, the shot characteristics are determined from the identified features and feedback is provided to the golfer at the display 225.

In an alternate embodiment, the steps 420-425 are replaced by a single integer programming optimization to more efficiently choose blob edge contours that make up a ball trajectory, as described below. Given a set of features X1, X2, X3, find N1, N2, N3 where N is one of {0, 1} so that pair_wise_dist(X1*N1, X2*N2, X3*N3, . . . ) is minimized, subject to: Variance(Speed_1_2, speed_2_3, . . . )<small value.

Mixed integer programming (MIP) models are optimization models where at least one variable is discrete. "Pure" integer programming is the case where all variables are discrete. The formulation of an MIP problem consists of an optimization model and a number of constraints in the form of inequalities and equations. MIP is used to find the track of ball objects (inliers) that, within a tolerance, lie close to a fitting line in the image (u, v)-plane and to detect outliers among other binary image objects based on the position of the objects and, in addition, object features such as width, length, and orientation. In the following, the optimization problem is formulated as maximizing the number of inliers when the data points are subject to a set of constraints. For N data points the optimization model is stated as $$\max \sum_{i}^{N} \sum_{j}^{N} \sum_{k}^{N} y_{ijk}$$

Here $y_{ijk}=1$ if point k is an inlier and a fitting line in the (u, v)-plane goes through point i and point j, and 0 otherwise. The model is subject to several constraints. In addition to $y_{ijk}$, another binary variable $z_{ij}$ is defined. If the fitting line goes through points i and j then $z_{ij}=1$, and 0 otherwise. In addition, the following constraint is introduced:

$$\sum_{i}^{N}\sum_{j}^{N} z_{ij} = 1$$

Furthermore, in a similar way to RANSAC, a distance constraint is imposed such that in the (u, v)-plane inliers must lie within a distance threshold ε from the fitting line, i.e. the distance constraint is defined as $$y_{ijk} d_{ijk} \leq \varepsilon$$

where $d_{ijk}$ is the distance from point k to the line going through points i and j. In order to ensure that $y_{ijk}$ can only equal to one for i and j that yields $z_{ij}=1$ the following constraint is introduced:

$$\sum_{k}^{N} y_{ijk} \leq N z_{ij}$$

Thus far, only the relation of the N data points with a fitting line has been dealt with, where we have associated i and j with coordinates u and v in the plane. If, for each data point, additional features such as the length and width of an object are associated therewith, then a constraint is added regarding the distance in feature space from data points to the 2 points i and j. Specifically, the constraint is defined as:

$$y_{ijk} D_{ijk} \leq \sigma$$

Here σ is the feature threshold. The distance $D_{ijk}$ in feature space is chosen as $$D_{ijk} = (dist(i, k) + dist(j, k))/2$$

Where dist( ) is the Euclidean distance. $D_{ijk}$ is thus the mean distance in feature space from point k to the points i and j which the fitting line in (u, v)-space goes through. The distances $d_{ijk}$ and $D_{ijk}$ given N data points can be calculated just before running the optimization and thus act as constant tensors. A COIN-OR Branch-and-Cut solver (CBC) can be used to perform the optimization.

It is noted that the method 400 is described as determining horizontal launch parameters only. Thus, the types of feedback provided to the golfer may be limited to horizontal speed, angle, a final resting position of the ball after the shot, etc. in the previously described embodiment. Determining vertical motion using only a single, overhead camera may be difficult. For example, a fast-moving ball may appear blurry in the captured frames. A blurry ball image may not substantially affect a horizontal distance/direction determination, but may be less reliable for determining vertical position based, for example, on a change in a width of a blurred ball image (an extent of a blurred ball image in a direction perpendicular to a direction of travel) between successive frames is small. However, an additional feature relating to the size of the ball may be extracted from the images in 415 and used to determine a vertical launch angle characteristic of variable reliability. In alternate embodiments, an approximate vertical launch angle may be determined as being within a particular range. Shot characteristics may be provided to the display 225 that encompass this variability. For instance, a range of approximate distances for the shot may be provided as shot feedback if the vertical launch angle cannot be determined reliably.

Alternately, a deep learning-based object detection may be introduced before the feature extraction step, or a deep learning-based classification of blobs may be introduced after the feature extraction step, making it possible to relax requirements for the size of the blobs detected in 410 in order to reliably detect balls at different distances from the camera and estimate the distance to the ball and provide a more accurate determination of vertical launch angle.

The aforementioned system 200 is described as a standalone system, disconnected from any central processing apparatus of the driving range 100. However, as previously mentioned, the described in-bay image processing system may be harmonized with the range tracking system in the manner described below.

FIG. 5 shows a system 500 implemented at the driving range 100 for providing shot feedback when a ball is unable to be tracked by other range sensors. In this embodiment, the range sensors include the range radars 140-142. As previously discussed, the range 100 has thirteen hitting bays 130 (i.e. hitting bays 130(1)-130(13)). In each of these hitting bays 130 is an imager 205 (i.e. imagers 205(1)-205(13)) as described above for determining shot characteristics and a display 225 (i.e. displays 225(1)-225(13)) as described above for providing feedback to a golfer in the hitting bay 130.

The system 500 includes a central processing arrangement 505 including a processor 510 and a memory 515. The central processing arrangement 505 may include any number of computers. For example, each hitting bay 130 may include the computer 210 described above for performing image analyses for shots originating from the respective hitting bay 130. However, in the present embodiment, these computers 210 are in communication with further processing arrangements (which may be run on the same or separate computing devices) that determine shot tracks from the radar data provided by the radars 140-142, as described above. Alternately, the image data from each hitting bay 130 is sent directly to and analyzed at the central processing arrangement 505. When shot characteristics are determined in accordance with the method 600 described below, feedback is provided from the central processing arrangement 505 to the display 225 at the hitting bay 130 from which the shot is determined to have originated.

The specifications of the other range sensors, e.g. the range radars 140-142, may impact the specifications of the in-bay cameras 205. For example, if it is assumed that balls launched at a speed greater than 15 m/s will be detected by the other driving range sensors, e.g. radars, the camera characteristics must be selected to capture data for balls launched at speeds of 15 m/s or less (perhaps with a slight overlap to ensure no shots are missed).

The radar devices 140-142 may, for example, be continuous wave Doppler radars emitting microwaves at an X-band frequency (9-11 GHZ) at a power of up to 500 milliWatts EIRP (Equivalent Isotropic Radiated Power), thus being compliant with FCC and CE regulations for short range international radiators. However, in other jurisdictions, other power levels may be used in compliance with local regulations. In an exemplary embodiment, microwaves are emitted at a higher frequency between, for example, 10-125 GHz. For more precise measurements at lower object speeds frequencies of 20 GHz or higher may be used.

It will be understood by those skilled in the art that the higher the Doppler radar transmit frequency, the higher the velocity resolution for the same observation time. A high velocity resolution may be desired to track the low velocity shots and to separate the ball from other objects in the field, i.e. golf club and golfer. An exemplary velocity resolution of less than 0.25 m/s is preferable. The high velocity resolution is useful also with short observation times (e.g., 0.100 seconds or less) to enable accurate tracking of velocity jumps to identify transitions between flying, bouncing, sliding and/or rolling states of the ball, the observation time being the time span for each.

FIG. 6 shows a method 600 for harmonizing shot data captured by multiple sensors of the system 500. In 605, a radar-based shot track is identified based on data from one or more of the radars 140-142, as described above. In 610, a hitting bay 130 is identified from which the radar-based shot track originated. Even when the signature of the shot is not picked up by the radar until some time after launch, the track may be projected back in time to where it originated.

Substantially simultaneously with steps 605-610, in 615, a shot is detected by the camera 205 of one of the hitting bays 130 and shot characteristics are determined, in accordance with the method 400 discussed above. The hitting bay 130 from which the shot originated is known based on the identity of the camera 205 that detected the shot. For example, if camera 205(5) detects the shot, the hitting bay 130 from which the shot originated is known to be hitting bay 130(5). The detection, feature extraction, etc. may be performed at an independent computer in the hitting bay 130 or may be performed at the central processing arrangement 505. If the image analysis steps are performed at the hitting bay 130, the characteristics are then sent to the central processing arrangement 505. The shot characteristics determined from the image data are associated with the hitting bay 130 and with a time of detection. Notably, the shot characteristics are not yet displayed on the display 225 in the hitting bay 130.

In 620, the shot characteristics determined from in-bay image data are compared to the track identified from the radar data and it is determined whether the shot corresponding to the shot characteristics was tracked by the radar system. If a match is found, the match comprising a same hitting bay and a same launch time (within some predetermined thresholds), then in 625 the shot characteristics determined from the image data are discarded. The radar tracking provides a much more comprehensive shot track than the image data, and is preferred if available. In 630, when the shot tracking by the radar system is completed, the shot characteristics determined from the radar data are sent to the in-bay display 225 from which the shot originated. If no match is found, in 635, the shot characteristics determined by the image data are sent to the in-bay display 225.

Thus, the foregoing method 600 provides the best shot tracking data available to the hitting bay 130 from which a shot originates. When a comprehensive shot track is unavailable because the signature of the shot was not picked up by the radar, the shot characteristics determined from image data provided by the in-bay camera may provide to the golfer a form of feedback that is more limited but is still valuable.

In an alternate embodiment, rather than a camera 205 being disposed in each hitting bay 130, a camera 205 is positioned on every other partition between two hitting bays 130. These cameras 205 will capture frames in a manner substantially similar to that described above. However, in this case, each image may be split in half and analyzed separately to distinguish between shots in the adjacent bays. The disposition of the camera at a horizontal angle to the launch position, rather than substantially above the launch position, may provide more reliable vertical flight path data than the first exemplary embodiment. However, this disposition may also provide less reliable horizontal flight path data than the first exemplary embodiment. In addition, this embodiment may provide a vantage point of a launched ball that is or may become occluded by the golfer and golf club during the golf swing, depending on the golfer's right- or left-handedness. Obviously, the concept might be expanded to cover more than two hitting bays 130.

In still another embodiment, a camera 205 is positioned on every partition between two hitting bays 130, and on the outer ends of each row of hitting bays. In other words, a camera is disposed on both sides of each hitting bay. This exemplary disposition of cameras may provide more information than cameras devoted to a single hitting bay. For example, travel path data may be generated for a single shot by two cameras from opposing vantage points, allowing for a stereo vision type analysis of the flight path. Note that traditional stereo analysis requires frames to be taken substantially simultaneous by the two cameras.

However, in this embodiment each camera might provide a separate tracking in the image plane where speed and direction is determined. By combining the speed and direction from two image planes from different vantage points a three-dimensional speed and a three-dimensional launch direction can be determined. In addition, the multi camera detection approach provides a more robust and accurate shot detection. In this manner, reliable horizontal and vertical flight path information may be generated. In addition, because two cameras observe each bay, this system is less likely to suffer from situations where data is unavailable at the launch location. In the event that the field of view of one of the two cameras becomes occluded, the remaining camera may have a clear view and generate sufficient image data to implement the previously discussed techniques to generate flight path data.

According to a still another embodiment, the system comprises one or more lidar scanners in lieu of cameras. The lidar scanner provides a 3D point cloud of the of the launch area 120 at high angular resolution, the angular resolution being adequate to detect the launch of, for example, a golf ball of diameter 42.1 mm. The scan rate needs to be sufficiently high, such at 20 Hz, to provide at least two scans of the moving ball while still being inside the field of view of the lidar scanner. A lidar scanner may be disposed at one of the two longitudinal ends of the hitting bays, i.e., on one side of the range, or at both of the ends of the hitting bays. The lidar may be slightly in front of the hitting bays and directed across the range surface. Alternately, the lidar may be further in front of the hitting bays and looking into the hitting bays.

The point cloud received from the lidar is filtered to provide only moving 3D points hereby excluding the background. The filtered point cloud is further filtered by comparing the points with the location of the hitting bays 130 to represent only points that have likely originated from a ball launched from one of the hitting bays. The remaining 3D points are then analyzed in a similar manner as for image detected positions to find points that agree with a substantially linear motion of a ball, the found points being used to generate launch direction and launch speed. The lidar may be, for example, a Velodyne LiDAR®.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A system for determining golf shot characteristics for each of a plurality of golf shots launched from a plurality of hitting bays arranged in a launch area, the system comprising:

a radar sensor arrangement including at least one radar configured to provide radar data for tracking a plurality of golf balls in simultaneous flight;

an imager having a field of view including at least a first one of the hitting bays; and a processing arrangement receiving data from the radar sensor arrangement and the imager, the processing arrangement being configured to identify an originating hitting bay from which each of the golf shots was launched based on at least one of radar data from the radar sensor arrangement and imager data from the imager and to determine, using the radar data, first trajectory data for each of a first subset of the golf shots and to determine based on the imager data, second trajectory data for each of a second subset of the golf shots, the processing arrangement being further configured to compare the first trajectory data from the first subset of the golf shots to the second trajectory data from the second subset of the golf shots to identify golf shots from the first and second subsets of the golf shots that represent the same golf shot, the processing arrangement being configured to send to a device associated with the originating hitting bay corresponding to each of the golf shots the second trajectory data for each of the golf shots of the second subset of golf shots when no golf shot representing the same golf shot is found in the first subset of the golf shots and the first trajectory data for each golf shot in the second subset of the golf shots for which a golf shot representing the same golf shot is identified in the first subset of the golf shots.

2. The system of claim 1, wherein the processing arrangement does not send to the device associated with the originating hitting bay the second trajectory data for each golf shot in the second subset of the golf shots for which a golf shot representing the same golf shot is identified in the first subset of the golf shots.

3. The system of claim 1, wherein the radar sensor arrangement comprises a first radar and a second radar directed toward the launch area.

4. The system of claim 3, wherein the radar sensor arrangement comprises a third radar directed from above the launch area toward a rear end of a target area.

5. The system of claim 1, wherein the radar sensor arrangement comprises a radar directed from above the launch area toward a rear end of a target area.

6. The system of claim 1, wherein a display is positioned in the hitting bay is configured to provide feedback to a golfer in the hitting bay based on the shot characteristics.

7. The system of claim 1, wherein the imager is configured to have a frame rate sufficiently high to capture multiple images of a ball in flight as the ball traverses the field of view of the imager.

8. The system of claim 7, wherein the imager has the frame rate between 60 and 120 frames per second.

9. The system of claim 1, wherein the shot characteristics determined by the processing arrangement based on the image data comprises a launch speed, a launch angle and an estimated distance traveled.

10. The system of claim 1, wherein the imager is positioned 3 to 5 meters above the hitting bay.

11. The system of claim 1, wherein the processing arrangement determines that the first trajectory data and the second trajectory data represent the same golf shot when the processing arrangement identifies a correspondence is between a launch location and a launch time between a shot from the first subset of golf shots and a golf shot from the second subset of golf shots.

12. The system of claim 1, wherein the processing arrangement calculates a motion image from a plurality of adjacent image frames from the imager in which a golf shot signature was detected, the motion image including a blur corresponding to the golf shot signature and wherein the processing arrangement extracts features corresponding to the blur from the motion image.

13. A method for determining golf shot characteristics for golf shots taken from a plurality of hitting bays located in a launch area, comprising:

capturing radar data, from a radar sensor arrangement, for golf shots launched from the hitting bays;

capturing image data from an imager having a field of view including at least a first one of the hitting bays;

using a processing arrangement, determining an origination hitting bay from which each of the golf shots was launched based on the radar data and the imager data;

using the processing arrangement, determining shot characteristics for each of the golf shots launched from at least the first one of the hitting bays based on the image data;

using the processing arrangement, determining shot characteristics for each of the golf shots launched from the hitting bays based on the radar data;

using the processing arrangement, comparing the shot characteristics determined based on the imager data to the shot characteristics determined based on the radar data to identify golf shots represented in the image data for which a matching golf shot is represented in the radar data, the processing arrangement determining that the shot characteristics based on the imager data of a first golf shot represent the same golf shot as a second golf shot when the shot characteristics of the second golf shot based on the radar data indicate a launch time and an origination hitting bay the same as indicated by the shot characteristics of the first golf shot; and supplying to a device associated with the origination hitting bay of the first golf shot the shot characteristics based on the image data when no matching golf shot for the first shot is found and, when a matching shot for the first golf shot is found, supplying to the device associated with the origination hitting bay of the first golf shot the shot characteristics for the matching shot based on the radar data.

14. The method of claim 13, wherein the processing arrangement determines the shot characteristics based on the image data using blob detection to identify image features correlating to a golf ball in motion.

15. The method of claim 14, wherein the processing arrangement determines the shot characteristics based on the image data by determining whether blobs detected in a plurality of images correspond to the same golf shot based on a spatial and temporal check.

16. The method of claim 13, wherein the capturing of imager data further comprises calculating a motion image from a plurality of adjacent image frames, the motion image including a blur corresponding to a golf ball in flight and extracting features corresponding to the blur from the motion image.

17. The method of claim 16, wherein the extracted features include a length, width, blur factor and horizontal angle of the blur.

18. The method of claim 13, wherein the shot characteristics include an initial velocity, an initial direction, and an estimated travel distance of the golf shot.

19. The method of claim 13, wherein the processing arrangement determines the shot characteristics based on the image data by processing a time ordered sequence of images.

* * * * *